United States Patent
Huang et al.

(10) Patent No.: US 8,294,299 B2
(45) Date of Patent: Oct. 23, 2012

(54) CONTROL DEVICE FOR DC-DC CONVERTER AND RELATED DC-DC CONVERTER

(75) Inventors: Wen-Hsiu Huang, Miaoli County (TW); Ciou-Fong Li, Taipei County (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 375 days.

(21) Appl. No.: 12/688,916

(22) Filed: Jan. 18, 2010

(65) Prior Publication Data
US 2011/0095741 A1 Apr. 28, 2011

(30) Foreign Application Priority Data
Oct. 23, 2009 (TW) ................. 98135890 A

(51) Int. Cl.
*H02J 1/00* (2006.01)
*H02J 3/00* (2006.01)

(52) U.S. Cl. .......... 307/75; 323/282; 323/283; 323/289; 323/271
(58) Field of Classification Search ............. 307/75, 307/18; 323/282–289
See application file for complete search history.

(56) References Cited

U.S. PATENT DOCUMENTS
6,430,070 B1 * 8/2002 Shi et al. .......... 363/97
7,847,532 B2 * 12/2010 Potter et al. ......... 323/283
* cited by examiner

*Primary Examiner* — Rexford Barnie
*Assistant Examiner* — Toan Vu
(74) *Attorney, Agent, or Firm* — Winston Hsu; Scott Margo

(57) ABSTRACT

A control device for a DC-DC converter includes a PWM controller for generating a PWM signal to a switch module of the DC-DC converter according to a feedback signal of the DC-DC converter, a logic circuit for generating a selection signal according to a magnitude of an output current of the DC-DC converter, and a multiplexer coupled to a plurality of voltages for selecting one of the plurality of voltages to be a supply voltage according to the selection signal.

15 Claims, 4 Drawing Sheets

CONTROL DEVICE FOR DC-DC CONVERTER AND RELATED DC-DC CONVERTER

BACKGROUND OF THE INVENTION

1. Field of the Invention

The present invention is related to a control device for a DC-DC converter and related DC-DC converter, and more particularly, to a control device that reduces a switching loss and a conduction loss of the DC-DC converter by adjusting a supply voltage of power switch components of the DC-DC converter, and related DC-DC converter.

2. Description of the Prior Art

An electronic device usually includes various components requiring different operating voltages. Therefore, a direct current to direct current (DC-DC) voltage converter is essential for the electronic device to adjust (step up or step down) and stabilize voltage levels. Based upon different power requirements, various types of DC-DC voltage converter, originating from a buck (step down) converter and a boost (step up) converter, are developed. Accordingly, the buck converter can decrease an input DC voltage to a default voltage level, and the boost converter can increase an input DC voltage. With advances in circuit technology, both the buck and boost converters are varied and modified to conform to different system architectures and requirements.

For example, please refer to FIG. 1, which is a schematic diagram of a buck converter 10 of the prior art. The buck converter 10 includes an input end 100, a lowpass module 110, a control module 120, a switch module 130, an output end 140, an output module 150 and a feedback module 160. The input end 100 is utilized for receiving a first input voltage VIN1. The lowpass module 110 is composed of an input inductor 112 and an input capacitor 114, and is utilized for filtering out high frequency components of the first input voltage VIN1 to generate a second input voltage VIN2. The control module 120 is a pulse width modulation (PWM) controller for generating a PWM signal VPWM sent to the switch module 130 according to the second input voltage VIN2 and a feedback signal VFB of the output end 140. The switch module 130 includes an upper-bridge switch transistor 132, a lower-bridge switch transistor 134, an amplifier 136 and an inverter 138, and is utilized for determining whether or not to enable the upper-bridge switch transistor 132 and the lower-bridge switch transistor 134 based upon the PWM signal VPWM (and an inverted PWM signal), so as to adjust a current of a node N1. The output module 150 coupled to the node N1 is composed of an output capacitor 152 and an output inductor 154, and is utilized for generating an output voltage VOUT by frequency response of the output inductor 152 and the output capacitor 154. In short, the control module 120 adjusts the output voltage VOUT by varying duty cycles of the upper-bridge switch transistor 132 and the lower-bridge switch transistor 134.

However, due to undesired effects caused by manufacturing process errors, and physical properties of components, etc., parasitic components essentially exist in the switch module 130, and lead to a performance decline in the buck converter 10. For example, when the buck converter 10 operates in a light load state (with a low output current IOUT), a "switching loss" is the major cause of the performance decline in the buck converter 10. In detail, when the switch module 130 performs switching operations, gate voltages of the upper-bridge switch transistor 132 and the lower-bridge switch transistor 134 cannot instantaneously hit a desired level due to parasitic gate capacitors thereof, but increase or decrease smoothly, leading to the switching loss of the upper-bridge switch transistor 132 and the lower-bridge switch transistor 134.

In addition, when the buck converter 10 operates in a heavy load state (with a high output current IOUT), a "conduction loss" is the major cause of the performance decline in the buck converter 10. More specifically, when the upper-bridge switch transistor 132 and the lower-bridge switch transistor 134 are enabled, equivalent resistors $RD_{DS\_ON}$ existing between drains and sources of the upper-bridge switch transistor 132 and the lower-bridge switch transistor 134 dissipate energy, leading to the conduction loss of the buck converter 10.

Therefore, how to enhance performance of the DC-DC converter by reducing the switching loss and the conduction loss has been a major area of research in industry.

SUMMARY OF THE INVENTION

It is therefore a primary objective of the claimed invention to provide a control device for a DC-DC converter and related DC-DC converter.

The present invention discloses a control device for a DC-DC converter. The control device includes a pulse width modulation (PWM) controller for generating a PWM signal sent to a switch module of the DC-DC converter according to a feedback signal of the DC-DC converter, a logic circuit for generating a selection signal according to a magnitude of an output current of the DC-DC converter, and a multiplexer coupled to a plurality of voltages and the logic circuit for selecting one of the plurality of voltages to be a supply voltage according to the selection signal.

The present invention further discloses a DC-DC converter, which includes an input end for receiving an input voltage, an output end for outputting an output voltage, a feedback module coupled to the output end for generating a feedback signal according to the output voltage, a switch module including a front end for receiving a pulse width modulation (PWM) signal, a back end, a power end for receiving a supply voltage, an upper-bridge switch transistor coupled to the input end the front end and the back end, for determining whether or not the input end is electrically connected to the back end according to the PWM signal, and a lower-bridge switch transistor coupled to the front end the back end and a ground end for determining whether or not the back end is electrically connected to the ground end according to an inverted signal of the PWM signal, an output module including an output inductor comprising one end coupled to the back end of the switch module and another end coupled to the output end, and an output capacitor comprising one end coupled to the output end and another end coupled to the ground end, a sensor coupled to the output inductor for sensing an output current of the DC-DC converter to generate a sensing signal, and a control device including a PWM controller coupled to the feedback module for generating the PWM signal sent to the switch module according to the feedback signal, a logic circuit for generating a selection signal according to the sensing signal, and a multiplexer coupled to a plurality of voltages and the logic circuit for selecting one of the plurality of voltages to be the supply voltage according to the selection signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
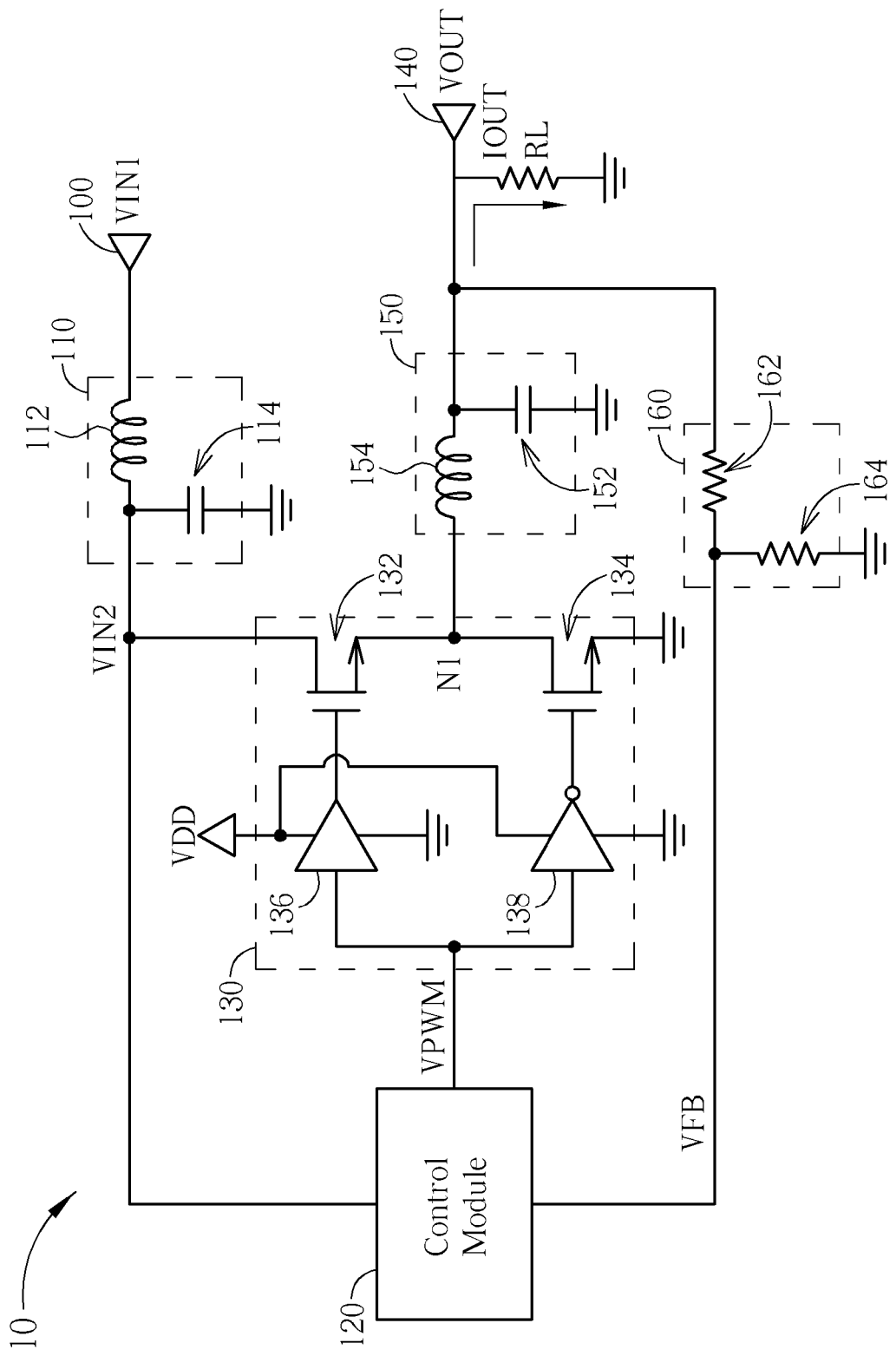
FIG. 1 is a schematic diagram of a buck converter 10 of the prior art.
Figure 2:
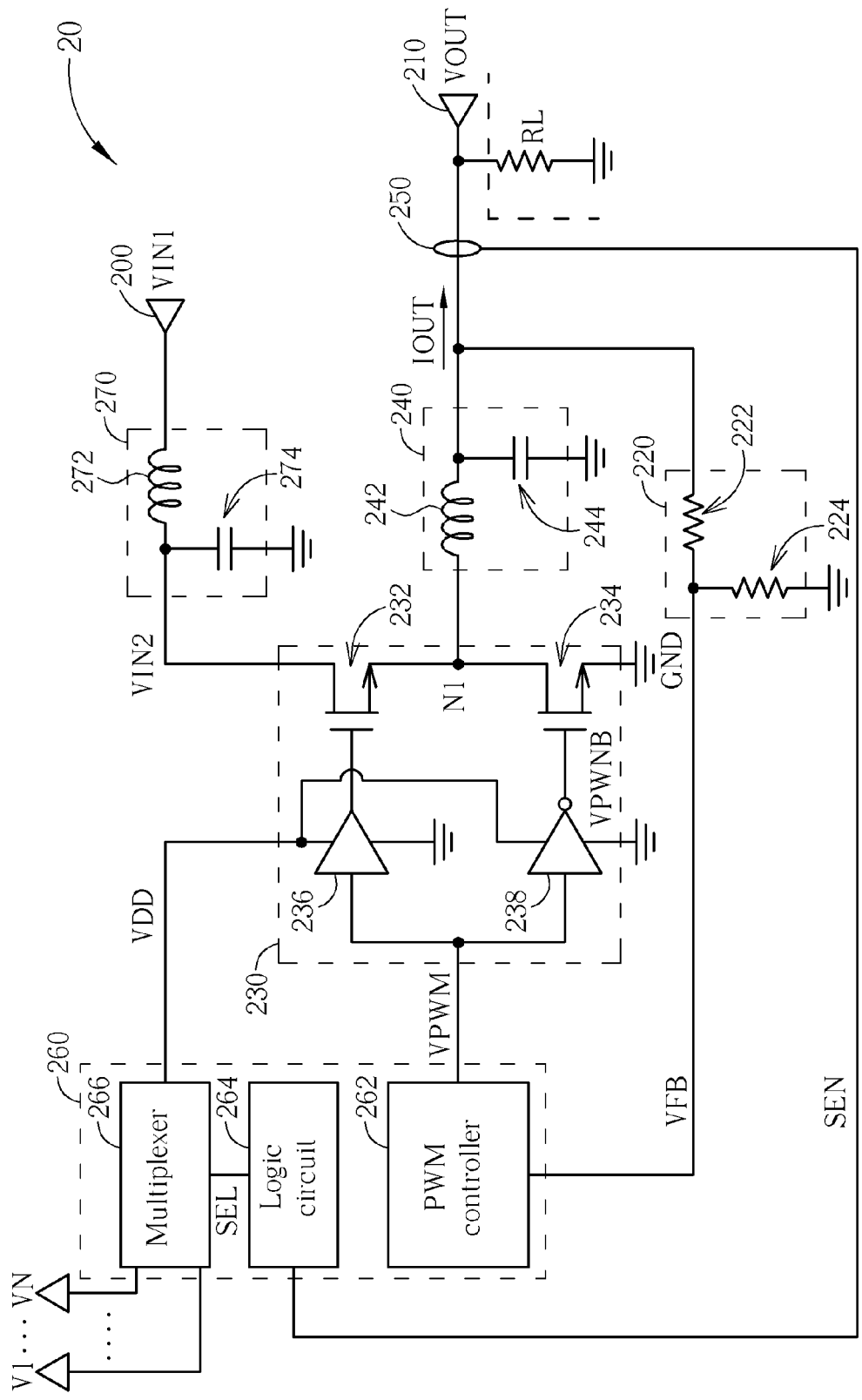
FIG. 2 is a schematic diagram of a DC-DC converter according to an embodiment of the present invention.

Please refer to FIG. 2, which is a schematic diagram of a DC-DC converter 20 according to an embodiment of the present invention. The DC-DC converter 20 includes an input end 200, an output end 210, a feedback module 220, a switch module 230, an output module 240, a sensor 250, a control device 260 and an input module 270. The input end 200 is utilized for receiving a first input voltage VIN1. The input module 270 comprises an input inductor 272 and an input capacitor 274, and is utilized for filtering out high frequency components of the first input voltage VIN1 to generate a second input voltage VIN2. The output end 210 is utilized for outputting an output voltage VOUT. The feedback module 220 is utilized for generating a feedback signal VFB according to the output voltage VOUT. The switch module 230 includes an upper-bridge switch transistor 232, a lower-bridge switch transistor 234, an amplifier 236 and an inverter 238. The amplifier 236 is utilized for amplifying a pulse width modulation (PWM) signal VPWM. The inverter 238 is utilized for amplifying the PWM signal VPWM and generating an inverted signal VPWMB of the PWM signal VPWM. The upper-bridge switch transistor 232 is utilized for determining whether or not the input end 200 is electrically connected to the output module 240 according to the PWM signal VPWM. The lower-bridge switch transistor 234 is utilized for determining whether or not the output module 240 is electrically connected to a ground end GND according to the inverted signal VPWMB. The output module 240 includes an output inductor 242 and an output capacitor 244, and is utilized for generating the output voltage VOUT. The sensor 250 is utilized for sensing an output current IOUT passing through the output module 240 to generate a sensing signal SEN. The control device 260 includes a PWM controller 262, a logic circuit 264 and a multiplexer 266. The PWM controller 262 is utilized for generating the PWM signal VPWM according to the feedback signal VFB, to determine whether or not to enable the switch module 230. The logic circuit 264 is utilized for generating a selection signal SEL according to the sensing signal SEN. The multiplexer 266 is utilized for selecting one of voltages V1-VN to be a supply voltage VDD of the switch module 230 according to the selection signal SEL.

In short, the DC-DC converter 20 determines loading of a load resistor RL of the DC-DC converter 20 by sensing the output current IOUT, and accordingly adjusts the supply voltage VDD of the switch module 230. In other words, the supply voltage VDD of the switch module 230 varies with the loading states of the DC-DC converter 20. As a result, a switching loss and a conduction loss of the DC-DC converter 20 can be effectively reduced, to enhance performance of the DC-DC converter 20.

In detail, the voltages V1-VN supplied to the multiplexer 266 respectively correspond to N loading states of the load resistor RL. For example, if the voltages V1-VN are arranged from the lowest to the highest, the voltage V1 can be corresponded to a light load state, and the voltage VN can be corresponded to a heavy load state. When the sensing signal SEN indicates that the load resistor RL is in the light load state, the logic circuit 264 can indicate the multiplexer 260 to select the lowest voltage V1 of the voltages V1-VN to be the supply voltage VDD by generating the corresponding selection signal SEL. Once the supply voltage VDD of the amplifier 236 and the inverter 238 decreases to V1, gate-to-source voltages $V_{GS}$ of the upper-bridge switch transistor 232 and the lower-bridge switch transistor 234 decrease as well, and thus the switching loss of the switch module 230 can be effectively reduced.

Similarly, when the sensing signal SEN indicates that the load resistor RL is in the heavy load state, the logic circuit 264 can indicate the multiplexer 260 to select the highest voltage VN of the voltages V1-VN to be the supply voltage VDD by generating the corresponding selection signal SEL. Once the supply voltage VDD of the amplifier 236 and the inverter 238 increases to the highest voltage VN, the gate-to-source voltages $V_{GS}$ of the upper-bridge switch transistor 232 and the lower-bridge switch transistor 234 increase as well. As a result, drain-to-source equivalent resistors RDS_ON of the upper-bridge switch transistor 232 and the lower-bridge switch transistor 234 effectively decrease, and thus the switching loss of the switch module 230 can be effectively reduced.

Certainly, in addition to the voltages V1, VN, those skilled in the art may design the supply voltage VDD with different levels to correspond to different load states. In addition, the logic circuit 264 estimates loading of the load resistor RL based upon the sensing signal SEN generated by the sensor 250. Preferably, the sensing signal SEN is directly proportional to the output current IOUT, but is not limited to this relationship.

Figure 3:
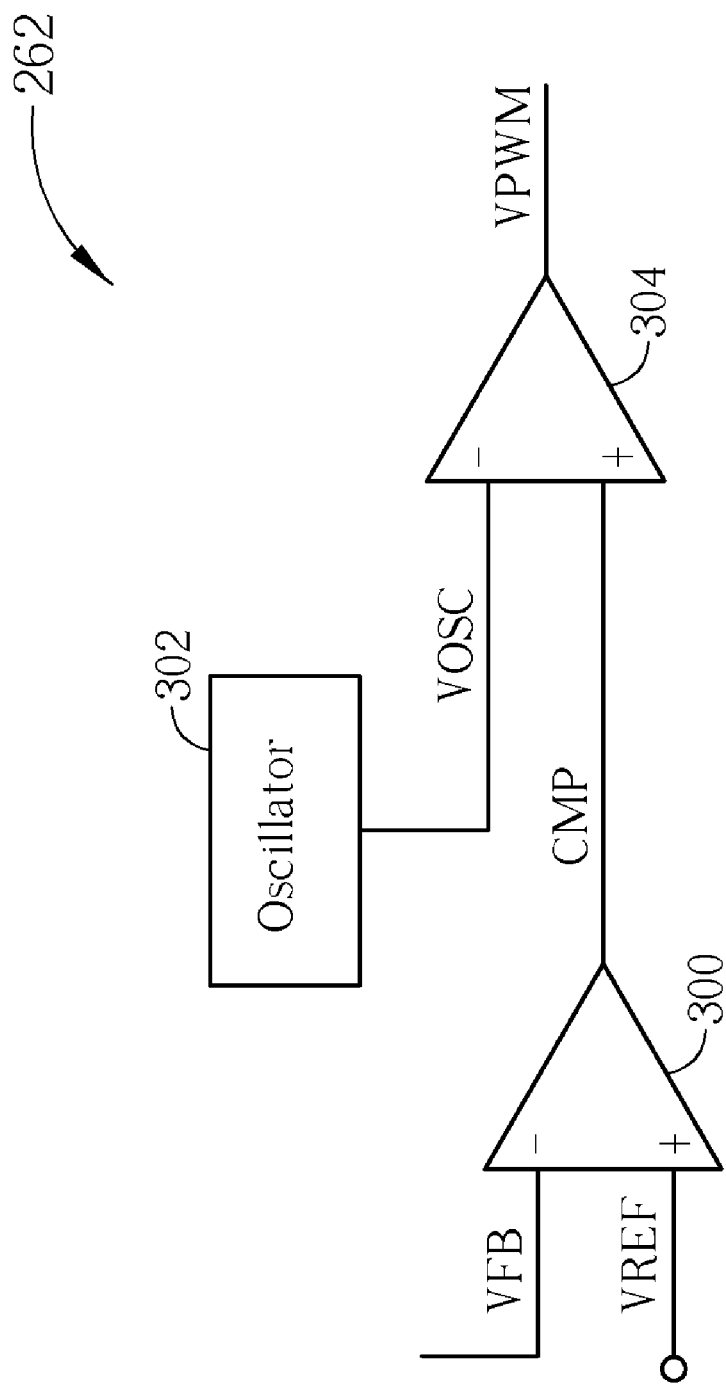
FIG. 3 is a schematic diagram of a pulse width modulation controller of the DC-DC converter shown in FIG. 2.

As to details of the PWM controller 262, please refer to FIG. 3, which is a schematic diagram of the PWM controller 262. The PWM controller 262 includes a first comparator 300, an oscillator 302 and a second comparator 304. The first comparator 300 is utilized for comparing and amplifying a difference between the feedback signal VFB and a reference voltage VREF to generate a comparison result CMP. The oscillator 302 is utilized for generating an oscillating signal VOSC. The second comparator 304 is utilized for comparing the comparison result CMP and the oscillating signal VOSC to generate the PWM signal VPWM. Since operations of the PWM controller 262 are not the major focus of the present invention and are well known to those skilled in the art, these operations are not further narrated herein.

Furthermore, the feedback module 220 preferably includes a first resistor 222 and a second resistor 224, and is utilized for generating a divided voltage of the output voltage VOUT to be the feedback signal VFB.

Figure 4:
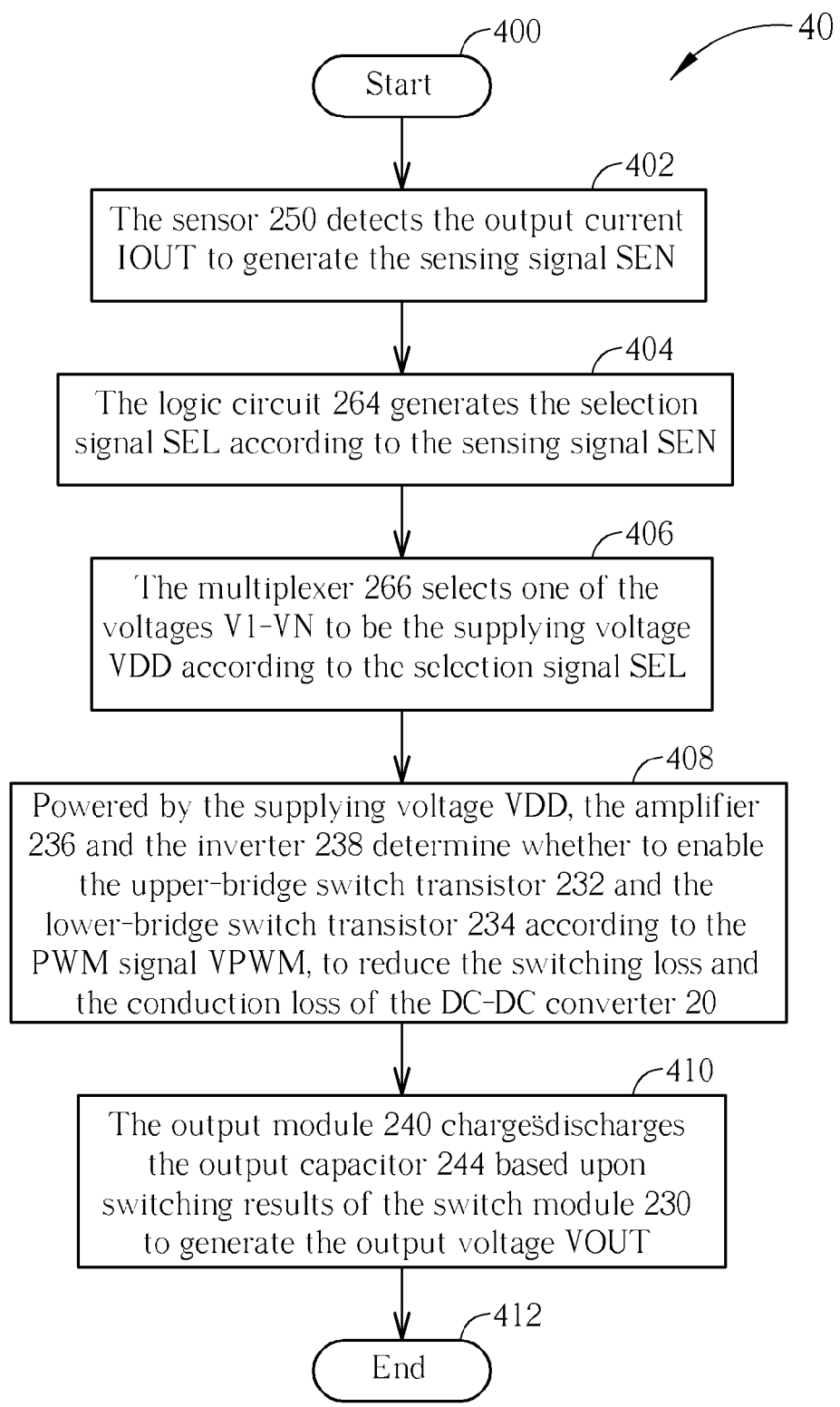
FIG. 4 is a schematic diagram of a process according to an embodiment of the present invention.

Operations of the DC-DC converter 20 and the control device 260 can be summarized into a process 40, as illustrated in FIG. 4. The process 40 includes the following steps:

Step 400: Start.

Step 402: The sensor 250 detects the output current IOUT to generate the sensing signal SEN.

Step 404: The logic circuit 264 generates the selection signal SEL according to the sensing signal SEN.

Step 406: The multiplexer 266 selects one of the voltages V1-VN to be the supply voltage VDD according to the selection signal SEL.

Step 408: Powered by the supply voltage VDD, the amplifier 236 and the inverter 238 determine whether to enable the upper-bridge switch transistor 232 and the lower-bridge switch transistor 234 according to the PWM signal VPWM, to reduce the switching loss and the conduction loss of the DC-DC converter 20.

Step 410: The output module 240 charges/discharges the output capacitor 244 based upon switching results of the switch module 230 to generate the output voltage VOUT.

Step 412: End.

Description of the process 40 can be referred in the above, and is not further narrated herein.

In the prior art, the supply voltage VDD of the switch module 130 of the buck converter 10 is a constant, and cannot be varied with the load current IOUT, such that the performance of the buck converter 10 suffers the remarkable switching and conduction losses. In comparison, the DC-DC converter 20 can adjust the supply voltage VDD of the switch module 230 based upon the load states, such as the light load state, the heavy load state, etc., to reduce the switching loss and the conduction loss and enhance the performance of the DC-DC converter 20.

To sum up, the present invention adjusts the supply voltage of power switch components of the DC-DC converter by sensing the load current, to reduce the switching loss and the conduction loss of the DC-DC converter.

Those skilled in the art will readily observe that numerous modifications and alterations of the device and method may be made while retaining the teachings of the invention.

What is claimed is:

1. A control device for a DC-DC converter, the control device comprising:
a pulse width modulation (PWM) controller, for generating a PWM signal sent to a switch module of the DC-DC converter according to a feedback signal of the DC-DC converter, the switch module comprising: an amplifier, coupled to a front end, a power end, a ground end and an upper-bridge switch transistor, for amplifying the PWM signal; and an inverter, coupled to the front end, the power end, the ground end and a lower-bridge switch transistor, for amplifying the PWM signal and generating an inverted signal of the PWM signal;
a logic circuit, for generating a selection signal according to a magnitude of an output current of the DC-DC converter; and
a multiplexer, electrically coupled to a plurality of voltages, the logic circuit and the power end, for selecting one of the plurality of voltages to be a supply voltage of the switch module according to the selection signal.

2. The control device of claim 1, wherein the plurality of voltages correspond to a plurality of load states of a load resistor of the DC-DC converter.

3. The control device of claim 2, wherein the logic circuit indicates the multiplexer to select a low voltage of the plurality of voltages to be the supply voltage by generating the corresponding selection signal when a sensing signal directly proportional to the output current indicates that the load resistor is in a light load state of the plurality of load states, to reduce a switching loss of the switch module.

4. The control device of claim 2, wherein the logic circuit indicates the multiplexer to select a high voltage of the plurality of voltages to be the supply voltage by generating the corresponding selection signal when a sensing signal directly proportional to the output current indicates that the load resistor is in a high load state of the plurality of load states, to reduce a conduction loss of the switch module.

5. The control device of claim 1, wherein the logic circuit estimates loading of a load resistor of the DC-DC converter according to a sensing signal directly proportional to the output current to generate the selection signal.

6. The control device of claim 1, wherein the PWM controller comprises:
a first comparator, for comparing and amplifying a difference between the feedback signal and a reference voltage to generate a comparison result;
an oscillator, for generating an oscillating signal; and
a second comparator, coupled to the first comparator and the oscillator, for comparing the comparison result and the oscillating signal to generate the PWM signal.

7. A DC-DC converter comprising:
an input end, for receiving an input voltage;
an output end, for outputting an output voltage;
a feedback module, coupled to the output end, for generating a feedback signal according to the output voltage;
a switch module comprising:
a front end, for receiving a pulse width modulation (PWM) signal;
a back end;
a power end, for receiving a supply voltage;
an upper-bridge switch transistor, coupled to the input end, the front end and the back end, for determining whether or not the input end is electrically connected to the back end according to the PWM signal; and
a lower-bridge switch transistor, coupled to the front end, the back end and a ground end, for determining whether or not the back end is electrically connected to the ground end according to an inverted signal of the PWM signal;
an amplifier, coupled to the front end, the power end, the ground end and the upper-bridge switch transistor, for amplifying the PWM signal; and an inverter, coupled to the front end, the power end, the ground end and the lower-bridge switch transistor, for amplifying the PWM signal and generating the inverted signal of PWM signal;
an output module comprising:
an output inductor, comprising one end coupled to the back end of the switch module and another end coupled to the output end; and
an output capacitor, comprising one end coupled to the output end and another end coupled to the ground end;
a sensor, coupled to the output inductor, for sensing an output current of the DC-DC converter to generate a sensing signal; and
a control device comprising:
a PWM controller, coupled to the feedback module, for generating the PWM signal sent to the switch module according to the feedback signal;
a logic circuit, for generating a selection signal according to the sensing signal; and
a multiplexer, electrically coupled to a plurality of voltages, the logic circuit and the power end, for selecting one of the plurality of voltages to be the supply voltage of the switch module according to the selection signal.

8. The DC-DC converter of claim 7 further comprising:
an input inductor, comprising one end coupled to the input end and another end coupled to the upper-bridge switch transistor; and
an input capacitor, comprising one end coupled between the input inductor and the upper-bridge switch transistor and another end coupled to the ground end.

9. The DC-DC converter of claim 7, wherein the plurality of voltages correspond to a plurality of load states of a load resistor of DC-DC converter.

10. The DC-DC converter of claim 9, wherein the logic circuit indicates the multiplexer to select a low voltage of the plurality of voltages to be the supply voltage by generating the corresponding selection signal when the sensing signal indicates that the load resistor is in a light load state of the plurality of load states, to reduce a switching loss of the switch module.

11. The DC-DC converter of claim 9, wherein the logic circuit indicates the multiplexer to select a high voltage of the plurality of voltages to be the supply voltage by generating the corresponding selection signal when the sensing signal indicates that the load resistor is in a high load state of the plurality of load states, to reduce a conduction loss of the switch module.

12. The DC-DC converter of claim 7, wherein the logic circuit estimates loading of a load resistor of the DC-DC converter according to the sensing signal to generate the selection signal.

13. The DC-DC converter of claim 7, wherein the sensing signal is directly proportional to the output current.

14. The DC-DC converter of claim 7, wherein the PWM controller comprises:

a first comparator, for comparing and amplifying a difference between the feedback signal and a reference voltage to generate a comparison result;

an oscillator, for generating an oscillating signal; and a second comparator, coupled to the first comparator and the oscillator, for comparing the comparison result and the oscillating signal to generate the PWM signal.

15. The DC-DC converter of claim 7, wherein the feedback module comprises:

a first resistor, comprising one end coupled to the output end and another end coupled to the PWM controller; and a second resistor, comprising one end coupled to the first resistor and the PWM controller and another end coupled to the ground end.

* * * * *